FIGURE 3 — INFRARED ABSORPTION SPECTRUM OF RANCOMYCIN I 2,4-DINITROPHENYLHYDRAZONE

PAPERGRAM OF RANCOMYCIN II

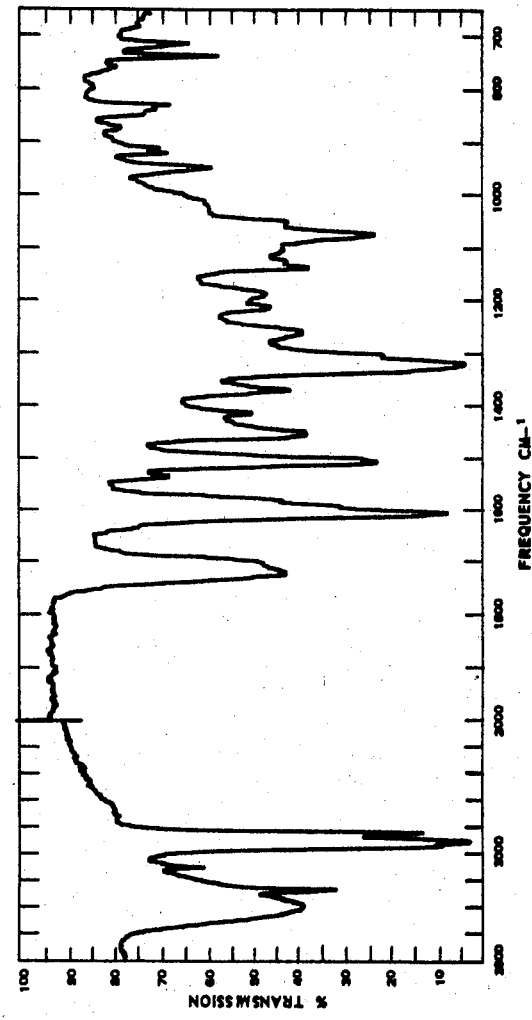

3,476,857
ANTIBIOTICS RANCOMYCIN I, RANCOMYCIN II, THEIR 2,4-DINITROPHENYLHYDRAZONES, AND MICROBIOLOGICAL AND CHEMICAL PROCESSES FOR PREPARING THE SAME
Alexander D. Argoudelis, Kalamazoo, and Thomas R. Pyke, Prairie Ronde Township, Kalamazoo County, Mich., assignors to The Upjohn Company, Kalamazoo, Mich., a corporation of Delaware
Filed Dec. 7, 1966, Ser. No. 599,751
Int. Cl. A61k *21/00;* C12d *9/22*
U.S. Cl. 424—118      13 Claims

ABSTRACT OF THE DISCLOSURE

New antibiotic compounds rancomycin I and rancomycin II, their 2,4-dinitrophenylhydrazones, and microbiological and chemical processes for the production thereof. Compounds can be used to inhibit the growth of various gram-positive and gram-negative bacteria, for example, *S. aureus, B. subtilis, E. coli,* and *P. vulgaris.*

BRIEF SUMMARY OF THE INVENTION

Rancomycin I (U–22,583) and rancomycin II (U–25,873) are chemical compounds which are producible by culturing *Streptomyces lincolnensis* var. *lincolnensis* in a synthetic aqueous nutrient medium substantially free of sulfate ions. Rancomycin I and rancomycin II are chemically neutral and have the biological property of adversely affecting the growth of various gram-positive and gram-engative bacteria, for example, *Staphylococcus aureus, Bacillus subtilis, Escherichia coli,* and *Proteus vulgaris.* Accordingly, rancomycin I and rancomycin II can be used alone or in combination with other antibiotic agents to prevent the growth of or reduce the number of bacteria, as disclosed above in various environments. The 2,4-dinitrophenylhydrazones of rancomycin I and rancomycin II are prepared by chemically reacting rancomycin I and rancomycin II with a reagent consisting of 2,4-dinitrophenylhydrazine and aqueous hydrochloric acid. These 2,4-dinitrophenylhydrazones are useful as ultraviolet light filters.

BRIEF DESCRIPTION OF THE DRAWING

FIGURE 6.—Infrared absorption spectrum of rancomycin II 2,4-dinitrophenylhydrazone.

CHEMICAL AND PHYSICAL PROPERTIES OF RANCOMYCIN I

Figure 1:
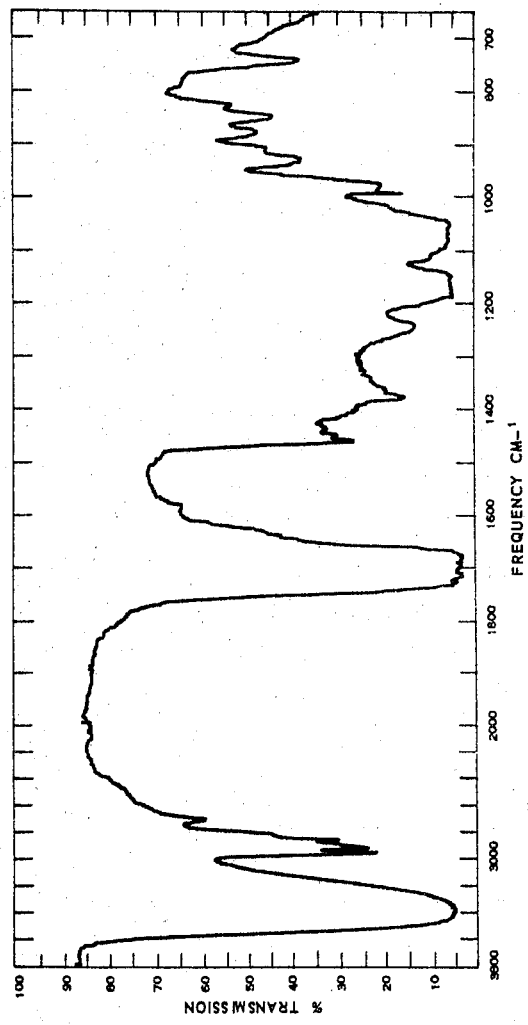
FIGURE 1.—Infrared absorption spectrum of rancomycin I.

Crystalline rancomycin I has the following chemical and physical properties:
Color: Colorless.
Ultraviolet absorption spectrum: Rancomycin I shows maximum absorption at 220 m$\mu$ ($a$=39) in 95% aqueous ethanol.
Solubilities: Soluble in water, methanol, ethanol and butanol; slightly soluble in chlorinated lower-alkanes, e.g., methylene chloride, chloroform, ethylene dichloride, and the like. Relatively insoluble in cyclohexane and like saturated hydrocarbons.
Optical rotation: $[\alpha]_D^{25}$=+95.9° (c., 1.027, water).
Infrared spectrum: The infrared absorption spectrum smear of rancomycin I is reproduced in FIGURE 1 of the drawing. Rancomycin I shows bands at the following wave-lengths expressed in reciprocal centimeters:
3400 (s.), 2965 (s.), 2925 (s.), 2870 (s.), 2720 (w.), 1675–1735 (s.), 1590 (w.), 1465 (s.), 1458 (m.), 1448 (m.), 1410 (m.), 1385 (s.), 1366 (s.), 1345 (s.), 1252 (s.), 1150–1195 (s.), 1050–1095 (s.), 1030 (m.), 985 (s.), 935 (m.), 915 (m.), 882 (m.), 855 (m.), 832 (w.), 787 (w.), 748 (m.).

Band intensities throughout this specification are indicated as "s.," "m.," and "w.," respectively, and are approximated in terms of the background in the vicinity of the band. An "s." band is of the same order of intensity as the strongest in the spectrum; "m." bands are between one-third and two-thirds as intense as the strongest band; and "w." bands are less than one-third as intense as the strongest band. These estimates are made on the basis of a percent transmission scale.

Figure 2:
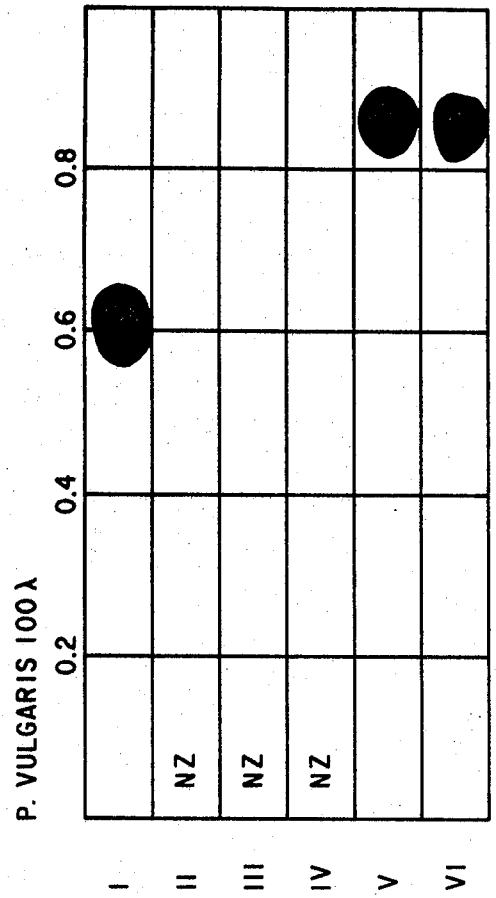
FIGURE 2.—Papergram of rancomycin I.

Rancomycin I has a characteristic papergram pattern as shown in FIGURE 2 of the drawing when using the following solvent systems:
(I) 1-butanol, water (84:16), 16 hours.
(II) 1-butanol, water (84:16), plus 0.25% p-toluenesulfonic acid, 16 hours.
(III) 1-butanol, acetic acid, water (2:1:1), 16 hours.
(IV) 2% piperidine (v/v) in 1-butanol, water (84:16), 16 hours.
(V) 1-butanol, water (4:96), 5 hours.
(VI) 1-butanol, water (4:96), plus 0.25% p-toluenesulfonic acid, 5 hours..

Rancomycin I is characterized further as its 2,4-dinitrophenylhydrazone as follows:
Elemental analysis: C, 47.65; H, 4.25; N, 12.93; O, 33.36; S, 0.26; halogens, trace.
Empirical formula: Calcd. for $C_{17}H_{20}N_4O_8$: C, 48.15; H, 4.75; N, 13.22; O, 33.96.
Molecular weight: 424 (calculated).
Equivalent weight: 411 (potentiometric titration).
Optical rotation: $[\alpha]_D^{25}$=—24° (c., 0.973, 95% ethanol).
Melting point: 146–149° C.
Ultraviolet absorption spectrum (in ethanol): max. at 208 m$\mu$, $a$=42.66; sh. at 235 m$\mu$, $a$=32.33; sh. at 248 m$\mu$, $a$=31.86; sh. at 283 m$\mu$, $a$=18.54; max. at 370 m$\mu$, $a$=65.27.
Infrared spectrum: The infrared absorption spectrum of rancomycin I 2,4-dinitrophenylhydrazone suspended in mineral oil mull is reproduced in FIGURE 3 of the drawing. Rancomycin I 2,4-dinitrophenylhydrazone shows bands at the following wave-lengths expressed in reciprocal centimeters:
3410 (m.), 3270 (m.), 3210 (m.), 2950 (s.) (oil), 2920 (s.) (oil), 2850 (s.) (oil), 1735 (m.), 1712 (m.), 1613 (s.), 1600 (m.), 1587 (m.), 1543 (w.), 1513 (s.), 1460 (s.) (oil), 1422 (w.), 1378 (m.) (oil), 1331 (s), 1313 (m.), 1268 (m.), 1219 (m.), 1200 (m.), 1158 (w.), 1146 (m.), 1132 (m.), 1107 (m.), 1078 (m.), 1058 (m.), 1041 (w.), 1021 (w.), 992 (w.), 955 (w.), 925 (w.), 919 (w.), 880 (w.), 853 (w.), 840 (w.), 833 (w.), 762 (w.), 742 (m.), 717 (m.).

Rancomycin I 2,4-dinitrophenylhydrazone shows bands at the following wave-lengths expressed in reciprocal centimeters when pressed in a KBr disc:
3420 (m.), 3285 (m.), 3105 (w.), 2960 (w.), 2930 (w.), 2875 (w.), 1702 (m.), 1617 (s.), 1600 (m.), 1585 (m.), 1537 (w.), 1515 (s.), 1468 (w.), 1426 (m.), 1385 (w.), 1370 (w.), 1331 (s.), 1311 (s.), 1271 (m.), 1224 (m.), 1186 (m.), 1141 (m.), 1088 (m.), 1058 (m.), 1000 (w.), 988 (w.), 950 (w.), 924 (w.), 917 (w.), 875 (w.), 842 (w.), 833 (w.), 800 (w.), 762 (w.), 742 (m.), 715 (w.).

CHEMICAL AND PHYSICAL PROPERTIES OF RANCOMYCIN II

Rancomycin II has the following chemical and physical properties:

Ultraviolet absorption spectrum (in ethanol): Max. at maximum absorption at 220 m$\mu$ ($a=30$) in 95% aqueous ethanol.

Solubilities: Soluble in water, methanol, ethanol and butanol; slightly soluble in chlorinated lower-alkanes, e.g., methylene chloride, chloroform, ethylene dichloride, and the like. Relatively insoluble in cyclohexane and like saturated hydrocarbons.

Optical rotation: $[\alpha]_D^{25}=+69°$ (c., 1.17, water).

Infrared spectrum: The infrared absorption spectrum (smear) of rancomycin II is reproduced in FIGURE 4 of the drawing. Rancomycin II shows bands at the following wave-lengths expressed in reciprocal centimeters:

3410 (s.), 2960 (s.), 2925 (s.), 2870 (m.), 2815 (m.), 2720 (w.), 1723 (s.), 1695 (s.), 1460 (m.), 1410 (m.), 1375 (s.), 1332 (m.), 1291 (m.), 1253 (s.), 1180 (s.), 1090 (s.), 1055 (s.), 1025 (s.), 990 (m.), 965 (m.), 935 (m.), 898 (m.), 848 (w.), 835 (w.), 797 (w.), 748 (m.).

Figure 5:
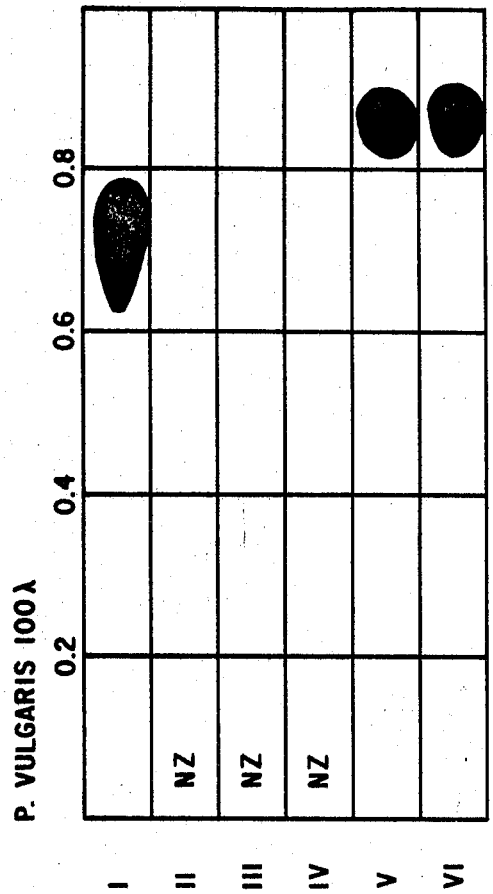
FIGURE 5.—Papergram of rancomycin II.

Rancomycin II has a characteristic papergram pattern as shown in FIGURE 5 of the drawing when using the same solvent systems as used for the papergram in FIGURE 2 of the drawing.

Rancomycin II is characterized further as its 2,4-dinitrophenylhydrazone as follows:

Elemental analyses: C, 48.77; H, 4.96; N, 12.79; O, 31.50; S, 0.21; halogens, trace.

Empirical formula: Calculated for $C_{18}H_{22}N_4O_9$: C, 49.36; H, 5.06; N, 12.79; O, 32.88.

Molecular weight: 438 (calculated).

Equivalent weight: 421 (potentiometric titration).

Optical rotation: $[\alpha]_D^{25}=-17°$ (c., 1.0, 95% ethanol).

Melting point: 162–163° C.

Ultraviolet absorption spectrum (in ethanol): max. at 208 m$\mu$, $a=40.82$; sh. at 235 m$\mu$, $a=30.92$; slight sh. at 248 m$\mu$, $a=30.46$; slight sh. at 283 m$\mu$, $a=17.81$; max. at 371 m$\mu$, $a=61.89$.

Infrared spectrum: The infrared absorption spectrum of rancomycin II 2,4-dinitrophenylhydrazone in mineral oil mull is reproduced in FIGURE 6 of the drawing. Rancomycin II 2,4-dinitrophenylhydrazone shows bands at the following wave-lengths expressed in reciprocal centimeters:

3405 (m.), 3280 (m.), 3105 (w.), 2950 (s.) (oil), 2920 (s.) (oil), 2850 (s.) (oil), 1726 (m.), 1706 (m.), 1613 (s.), 1600 (m.), 1585 (m.), 1540 (w.), 1514 (s.), 1460 (m.), 1420 (m.), 1375 (m.), 1329 (s.), 1310 (s.), 1266 (m.), 1220 (m.), 1192 (m.), 1143 (m.), 1130 (m.), 1110 (m.), 1080 (s.), 1066 (m.), 1032 (w.), 1018 (w.), 983 (w.), 952 (w.), 923 (w.), 915 (w.), 875 (w.), 848 (w.), 840 (w.), 832 (w.).

Rancomycin II 2,4-dinitrophenylhydrazone shows bands at the following wave-lengths expressed in reciprocal centimeters when pressed in a KBr disc:

3420 (m.), 3285(m.), 3105 (w.), 2960 (w.), 2930 (w.), 2875 (w.), 1702 (m.), 1617 (s.), 1600 (m.), 1585 (m.), 1537 (w.), 1515 (s.), 1460 (w.), 1426 (m.), 1370 (m.), 1331 (s.), 1311 (s.), 1271 (m.), 1224 (m.), 1186 (m.), 1141 (m.), 1088 (m.), 1058 (m.), 1030 (w.), 1000 (w.), 950 (w.), 924 (w.), 917 (w.), 875 (w.), 842 (w.), 833 (w.), 800 (w.), 762 (w.), 742 (m.), 715 w.).

DETAILED DESCRIPTION

(A) Production of the antibiotics

Rancomycin I and rancomycin II are produced concurrently when the microorganism *Streptomyces lincolnensis* var. *lincolnensis* is grown in a synthetic fermentation medium substantially free of sulfate ion. Advantageously, the medium should contain low phosphate levels, and the pH of the fermentation should be maintained below pH 7.5.

A suitable strain of *Streptomyces lincolnensis* var. *lincolnensis* for the production of rancomycin I and rancomycin II is disclosed in U.S. Patent 3,086,912 and has the repository designation NRRL 2936.

A synthetic medium suitable for the production of rancomycin I and rancomycin II contains a source of carbohydrate, for example, glucose monohydrate and the like; a nitrogen source, for example, amomnium nitrate and the like; and various minerals and salts such as sodium citrate, dipotassium phosphate, sodium chloride, zinc chloride, ferrous chloride tetrahydrate, magnesium citrate and the like. It is especially important in the composition of the synthetic fermentation medium that sulfate ion be reduced to a minimum in the medium. Thus, the ingredients listed above can be varied and other salts similar thereto can be incorporated into the synthetic medium as long as a proper balance is maintained and sulfate ion is kept to a minimum in the medium. In order to avoid the introduction of sulfate ion into the medium, it is advantageous to use distilled or deionized water rather than tap water. Also, should the pH of the fermentation rise to a level where pH control is necessary, for example, above pH 7.4, then it is advantageous to control the pH by the addition of hydrochloric acid rather than phosphoric or sulfuric acid. Though the phosphate level is considered somewhat critical to obtain optimum yields of rancomycin I and rancomycin II, phosphate ion levels less than about 2.5 g./liter are generally not detrimental.

Rancomycin I and rancomycin II are produced when *Streptomyces lincolnensis* var. *lincolnensis* is grown in a synthetic nutrient medium under submerged aerobic conditions. It is to be understood also that for the preparation of limited amounts, surface cultures in bottles can be employed. The seed medium for the fermentation need not be a synthetic medium since the seed inoculum is but a small portion of the fermentation medium total. Thus, various carbon sources such as glucose, brown sugar, sucrose, glycerol, starch, corn starch, lactose, dextrin, molasses, and the like may be utilized in the seed medium. The preferred carbon source is glucose monohydrate. Nitrogen sources for the seed medium include corn steep liquor, yeast, autolyzed brewer's yeast with milk solids, soybean meal, cottonseed meal, cottonseed fluor, cornmeal, milk solids, pancreatic digest of casein, distiller's solubles, animal peptone liquors, meat and bone scraps, and the like. The preferred nitrogen source is cottonseed flour. Since sulfate ion is not included in the medium for the production of rancomycin I and rancomycin II, lincomycin compounds, produced by *S. lincolnensis* var. *lincolnensis* in media containing sulfate ions, are not produced. Should some sulfate ion be introduced inadvertently into the rancomycin medium, lincomycin compounds which may be produced in trace amounts are effectively separated from rancomycin I and II during the purification process described herein.

Production of rancomycin I and rancomycin II can be effected at any temperature conductive to satisfactory growth of the microorganism, for example, between about 18° and 40° C., and preferably between about 20° and 32° C. Ordinarily, optimum production of the compound is obtained in about 2 to 10 days. The medium stays fairly close to neutral during the fermentation. The final pH is dependent, in part, on the buffers present, if any, and in part on the initial pH of the culture medium which is advantageously adjusted to about pH 7.2 prior to sterilization. The pH of the fermentation can be controlled advantageously between a pH of 7.0 and 7.4 by the addition of hydrochloric acid.

When growth is carried out in large vessels and tanks, it is preferable to use the vegetative form, rather than the spore form, of the microorganism for inoculation to avoid a pronounced lag in the production of the new compound and the attendant inefficient utilization of the equipment.

Accordingly, it is desirable to produce a vegetative inoculum in a nutrient broth culture by inoculating the broth culture with an aliquot from a soil or slant culture. When a young, active vegetative inoculum has thus been secured, it is transferred aseptically to large vessels or tanks.

Rancomycin I and rancomycin II are neutral chemical compounds. They are soluble in water, methanol, ethanol, and butanol; slightly soluble in chlorinated lower-alkanes, e.g., methylene chloride, chloroform, ethylene dichloride, and the like; and relatively insoluble in cyclohexane and like saturated hydrocarbons.

(B) Recovery of the antibiotics

Rancomycin I and rancomycin II are produced concurrently in the above-described fermentation in varying amounts. These compounds are initially recovered from the fermentation as a crude mixture of the compounds which can then be resolved into the respective compounds by further purification techniques as described hereinafter.

A variety of procedures can be employed in the isolation and purification of rancomycin I and rancomycin II, for example, solvent extraction, silica gel chromatography, liquid-liquid distribution in a Craig apparatus, and crystallization from solvents.

In a preferred recovery process, rancomycin I and rancomycin II, as a mixture of the two compounds, are recovered from their culture medium by separation of the mycelial and undissolved solids by conventional means such as by filtration or centrifugation. The antibiotics are then removed from the filtered or centrifuged broth by absorption on a surface-active adsorbent, for example, Florisil (a synthetic silicate of the type described in U.S. Patent 2,393,625 and sold by The Floridin Company), decolorizing carbon, or decolorizing resin, and eluting the adsorbed material with a solvent. A suitable decolorizing resin is Permutit DR (U.S. Patent 2,702,263). A preferred adsorbent material is activated carbon and a preferred solvent is acetone. The eluate from the adsorption process can be freeze-dried to provide a preparation comprising a mixture of rancomycin I and rancomycin II. This preparation can be used in environments where higher purity or resolution of the antibiotics into their respective entities is not essential.

Alternatively, rancomycin I and rancomycin II can be recovered from the culture medium by filtering the medium, extracting the filtrate with methylene chloride, extracting the spent beer with n-butanol, and concentrating the butanol extracts to a mixture containing rancomycin I and rancomycin II.

High purity rancomycin I and rancomycin II, as separate chemical compounds, can be obtained by subjecting an impure preparation of a rancomycin mixture, obtained as described above, to liquid-liquid distribution in a Craig apparatus using a solvent system consisting of 1-butanol: water in equal parts. Alternatively, high purity rancomycin I and rancomycin II can be obtained by subjecting an impure preparation of rancomycin mixture to chromatographic techniques involving partition or adsorption principles. For example, an impure preparation of rancomycin mixture can be subjected to silica gel chromatography using a solvent system composed of methyl ethyl ketone-acetone-water (140:40:22 v/v) to develop the column. These procedures effectively separate rancomycin I and rancomycin II from a mixture containing these compounds.

(C) Antibacterial properties of the antibiotics

Rancomycin I has a broad antibacterial spectrum as shown in Table I. The antibacterial spectrum was determined by using a standard agar diffusion assay utilizing 12.7 mm. discs.

TABLE I.—ANTIBACTERIAL ACTIVITY OF RANCOMYCIN I

| Test organism: | Zone diameter (mm.) |
|---|---|
| Salmonella schottmuelleri | 17 |
| Staphylococcus aureus | 23 |
| Proteus vulgaris | 20 |
| Sarcina lutea | 19 |
| Escherichia coli | 17 |
| Bacillus subtilis | 15 |

Rancomycin II also has a broad antibacterial spectrum as shown in Table II. The antibacterial spectrum was determined in the same manner as disclosed above for Table I.

TABLE II.—ANTIBACTERIAL ACTIVITY OF RANCOMYCIN II

| Test organism: | Zone diameter (mm.) |
|---|---|
| Salmonella schottmuelleri | 16 |
| Staphylococcus aureus | 24 |
| Proteus vulgaris | 20 |
| Sarcina lutea | 19 |
| Escherichia coli | 16 |
| Bacillus subtilis | 15 |

(D) Utilities of the antibiotics

The new compounds of the invention, rancomycin I and rancomycin II are active against Bacillus subtilis and can be used to minimize or prevent odor in fish and fish crates caused by this organism. Rancomycin I and rancomycin II also can be used as disinfectants on various dental and medical equipment contaminated with Staphylococcus aureus; and they can be used as disinfectants on washed and stacked food utensils contaminated with Staphylococcus aureus. Rancomycin I and rancomycin II also can be used as oil preservatives, for example, as bacteriostatic agents for inhibiting the growth of Proteus vulgaris which is known to cause spoilage in cutting oils. Also these compounds are useful in wash solutions for sanitation purposes, as in the washing of hands and the cleaning of equipment, floors, or furnishings of contaminated rooms or laboratories; and they are also useful as industrial preservatives, for example, as bacteriostatic rinse for laundered clothes and for impregnating papers and fabrics; and they are useful for suppressing the growth of sensitive organisms in plate assays and other microbiological media. They also can be used as feed supplements to promote the growth of animals, for example, mammals, birds, fish, and reptiles.

(E) Production of the 2,4-dinitrophenylhydrazones

Rancomycins I and II can be converted to their respective 2,4-dinitrophenylhydrazone derivatives by the use of Brady's reagent (prepared by dissolving 1 gram of 2,4-dinitrophenylhydrazine in 1 liter of 2 N aqueous hydrochloric acid). For example, upon reacting an aqueous solution of rancomycin I with Brady's reagent for about 24 hours at room temperature, there is obtained a crystalline precipitate of rancomycin I 2,4-dinitrophenylhydrazone. This product can be recovered by filtration and the crystals dried in vacuo.

In a like manner, rancomycin II can be converted to rancomycin II 2,4-dinitrophenylhydrazone. Also, an admixture of rancomycin I and II can be converted to an admixture of rancomycin I 2,4-dinitrophenylhydrazone and rancomycin II 2,4-dinitrophenylhydrazone. This latter mixture can be resolved by procedures herein disclosed for the resolution of mixtures of rancomycin I and II, to yield the separate compounds.

(F) Utilities of the 2,4-dinitrophenylhydrazones

The 2,4-dinitrophenylhydrazones of rancomycin I and rancomycin II are useful to further characterize rancomycin I and rancomycin II. That is, by converting rancomycin I and rancomycin II to their 2,4-dinitrophenylhydrazones, it is possible to obtain additional characterization parameters on rancomycin I and rancomycin II. The 2,4-dinitrophenylhydrazones of rancomycin I and rancomycin II are also useful as ultraviolet light filters.

(G) Examples

The following examples are illustrative of the process and products of the present invention, but are not to be construed as limiting. All percentages are by weight and all solvent mixture proportions are by volume unless otherwise noted.

EXAMPLE 1

(A) Fermentation

A soil stock of *Streptomyces lincolnensis* var. *lincolnensis*, NRRL 2936, is used to inoculate a series of 500-ml. Erlenmeyer flasks, each containing 100 ml. of sterile preseed medium consisting of the following ingredients:

| Ingredient | Amount |
|---|---|
| Glucose monohydrate | g./liter__ 10 |
| Yeastolac [1] | g./liter__ 10 |
| N-Z-amine B [2] | g./liter__ 0.5 |
| Distilled water q.s. | liter__ 1 |

[1] Partial yeast autolyzate mixed with milk solids, Vico Products Corporation, Chicago, Ill.
[2] Enzymatic digest of casein, Sheffield Chemical Company, Norwich, N.Y.

The presterilization pH is adjusted to 7.2 with aqueous sodium hydroxide.

The flasks are incubated at 28° C. for 48 hours on a Gump rotary shaker operating at 250 r.p.m.

One preseed flask (100 ml.), described above, is used to inoculate a 40-liter seed tank containing 20 liters of sterile seed medium consisting of the following ingredients:

| Ingredient | Amount |
|---|---|
| Glucose monohydrate | g./liter__ 25 |
| Pharmamedia [1] | g./liter__ 25 |
| Ucon LB 625 [2] | ml./liter__ 1 |
| Deionized water q.s. | Balance |

[1] Pharmamedia is an industrial grade of cottonseed flour produced by Trader's Oil Mill Company, Fort Worth, Tex.
[2] UCON LB 625 is a polyalkylene glycol sold as an antifoaming agent by the Union Carbide Chemical Corporation.

The presterilization pH is adjusted to 7.2 with aqueous sodium hydroxide.

The seed is grown for 48 hours at a temperature of 28° C., with aeration at a rate of 10 standard liters/minute, and agitation at a rate of 400 r.p.m.

A portion of the seed inoculum (12.5 liters), as described above, is then used to inoculate a 400-liter fermenter containing 250 liters of sterile fermentation medium consisting of the following ingredients:

| Ingredient | Amount |
|---|---|
| Glucose monohydrate | g./liter__ 30 |
| Trisodium citrate | g./liter__ 1.8 |
| Ammonium nitrate | g./liter__ 2.0 |
| Zinc chloride | mcg./liter__ 474 |
| Lard oil | ml./liter__ 10 |
| Deionized water | Balance |

The presterilization pH of the medium minus the glucose monohydrate is approximately 7.1. The glucose monohydrate is sterilized separately from the medium ingredients. The fermentation proceeds for about 66 hours during which time the temperature is controlled at 28° C., filtered air is supplied at a rate of 100 standard liters per minute, and agitation at the rate of 280 r.p.m. At 66 hours, a typical rancomycin fermentation beer assayed 12.4 biounits of rancomycin. The assay was conducted against the microorganism *Proteus vulgaris*. The procedure for the *Proteus vulgaris* assay is as follows:

(a) Medium.—Upjohn Mineral Salts Agar (BBL) is used as a base layer and is prepared by adding 27.1 g. per liter to distilled water. This medium has the following composition:

| Ingredient | Grams/liter |
|---|---|
| Monopotassium phosphate | 3.0 |
| Dipotassium phosphate | 7.0 |
| Magnesium sulfate | 0.1 |
| Ammonium sulfate | 1.0 |
| Trisodium citrate | 1.0 |
| Agar (Difco) | 15.0 |

After autoclaving at 121° C., the agar medium is cooled to 48° C.

Sterile supplements are added as follows:

| Ingredient | Amount added (ml./liter) of medium |
|---|---|
| 20% glucose | 10 |
| 0.5% D, L-tryptophan | 20 |
| Eagles 100X Vitamins [1] | 10 |

[1] Prepared by Microbiological Associates, Bethesda, Md. Reference: H. Eagle, Science, 130: 432 (1959).

(b) Inoculation.—The medium is inoculated with 2 ml. of an overnight culture grown in Antibiotic Medium 3 Broth (a complete medium prepared and sold by Difco Laboratories, Detroit, Michigan) at 37° C. 125 ml. of the inoculated medium is poured in a tray.

(c) Assay.—Assays are performed by placing 12.7 mm. paper filter discs on the surface of the seeded medium and then adding 0.08 ml. of suitable dilutions of the antibiotic solution onto the surrface of the disc.

(d) Incubation.—The trays are incubated at 32° C. overnight.

(e) Biounits.—The level of antibiotic present is expressed in biounits. A biounit is defined as the amount of antibiotic necessary to produce a 20 mm. zone of inhibition at 20 hours of incubation.

(B) Recovery

Whole beer from a rancomycin fermentation, as described above, was filtered with the aid of diatomaceous earth. The filtered beer (3,000 ml. assaying 16.4 biounits/ml. on the *Proteus vulgaris* assay) was passed through an activated carbon column. (The activated carbon column was prepared by mixing the carbon with water and heating the slurry on the steam bath for 30 minutes prior to its use.) The filtered beer was passed through the activated carbon column at a rate of approximately 40 ml./minute. The column was then washed with water and the water wash discarded. The column was then washed with 20% aqueous acetone (one-half clear beer volume), and 40% acetone (one-sixth clear beer volume) and these eluates were discarded. The carbon column was then eluted with the following which were collected and assayed for rancomycin:

(a) 60% aqueous acetone (one-sixth clear beer volume).

(b) 90% acetone (volume equal to the clear beer volume).

The 60% acetone fraction (one-sixth clear beer volume) afforded a rancomycin mixture assaying 16.0 biounits/mg. against *P. vulgaris*.

The 90% acetone eluates (one and one-sixth clear beer volume) were collected in five equal fractions. Fraction No. 1 afforded a rancomycin mixture assaying 10 biounits/mg. against *P. vulgaris*. Fractions 2, 3, 4 and 5 were combined and afforded a rancomycin mixture assaying 7.0 biounits/mg. against *P. vulgaris*.

Paper chromatography revealed the presence of rancomycin I and II in the above three preparations.

(C) Purification

A rancomycin I and rancomycin II mixture (ca. 3.0 g.), obtained as described above, was dissolved in absolute methanol. The methanolic solution was concentrated to dryness; yield, 3.0 g. This material was then distributed in an all-glass Craig counter current distribution apparatus (500 tubes, 10 ml./phase) using a solvent system consisting of equal parts of 1-butanol and water. After 128 transfers, the solutions in tubes 2–13 and 114–129 were removed. The solutions from tubes 2–13 were combined and the combined solution was concentrated to dryness. The dry material was found to be bio-inactive. Similarly, tubes 114–129 gave a preparation which was found to be bio-inactive. New solvent, as disclosed above, was added in tubes 2–13 and 114–129 and the distribution was continued until a total of 467 transfers were obtained. The solutions from tubes 215–280 ($K=1.15$) were combined and the combined solution was concentrated to dryness to give a viscous oil which crystallized on standing. This preparation was analyzed by paper chromatography and found to be rancomycin I. The solutions from tubes 300–365 ($K=2.40$) were combined and the combined solution was concentrated to dryness to give a viscous oil which crystallized on standing. This preparation was analyzed by paper chromatography and found to be rancomycin II.

EXAMPLE 2

Rancomycin I—2,4-dinitrophenylhydrazone

Rancomycin I (116 mg.), prepared as described in Example 1, was dissolved in 10 ml. of water. This solution was mixed with 400 ml. of Brady's reagent (prepared by dissolving 1 g. of 2,4-dinitrophenylhydrazine in 1 liter of 2 N aqueous hydrochloric acid). The mixture was allowed to stand at room temperature for 24 hours. The crystalline precipitate of rancomycin I 2,4-dinitrophenylhydrazone was separated by filtration and dried; yield, 130 mg.

EXAMPLE 3

Rancomycin II—2,4-dinitrophenylhydrazone

Rancomycin II (100 mg.), prepared as described in Example 1, was dissolved in 5 ml. of 95% ethanol and the solution was mixed with 300 ml. of Brady's reagent. The mixture was allowed to stand at room temperature for 8 hours. The precipitated rancomycin II 2,4-dinitrophenylhydrazone was isolated by filtration and dried; yield, 90 mg.

We claim:

1. A fermentation broth obtained from a rancomycin fermentation using the microorganism *Streptomyces lincolnensis* var. *lincolnensis* which is grown in an aqueous synthetic nutrient medium substantially free of sulfate ions, under submerged aerobic conditions, at a pH below about 7.5, said fermentation broth assaying at least 12.4 biounits of a mixture of rancomycin I and rancomycin II per ml. and being substantially free of lincomycin.

2. Filtered beer obtained from the fermentation broth of claim 1, said filtered beer assaying at least 16.4 biounits/ml. of an admixture of rancomycin I and rancomycin II on the *Proteus vulgaris* assay, and being substantially free of lincomycin.

3. The composition of matter of claim 1 in dry form, said composition of matter assaying at least 7.0 biounits/mg. of an admixture of rancomycin I and rancomycin II on the *Proteus vulgaris* assay, and being substantially free of lincomycin.

Figure 3:
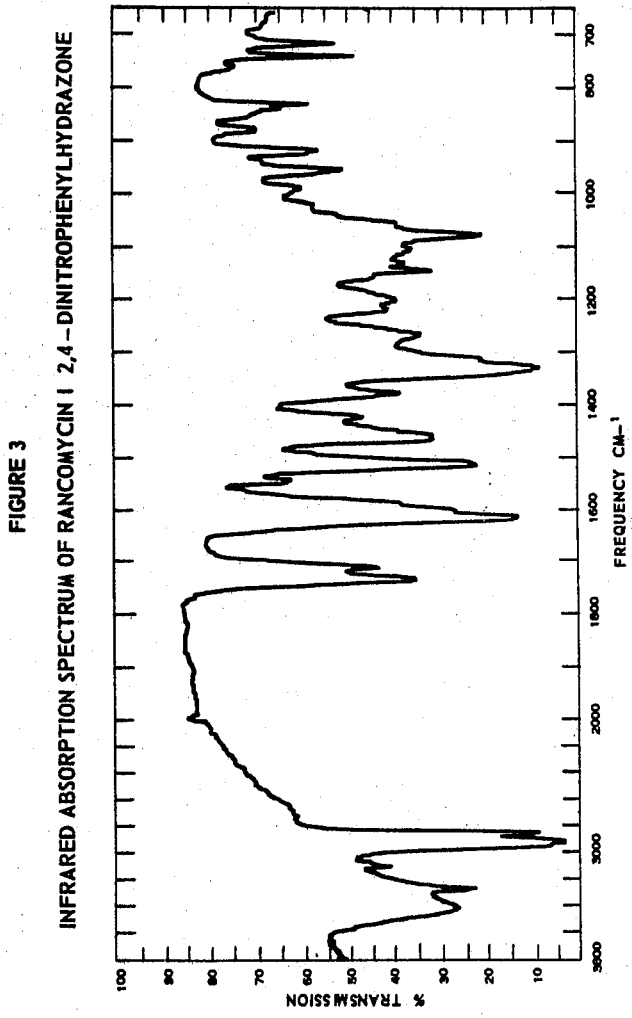
FIGURE 3.—Infrared absorption spectrum of rancomycin I 2,4-dinitrophenylhydrazone.

4. Rancomycin I, a compound which is substantially free from admixture with rancomycin II and which (a) is effective in inhibiting the growth of various gram-negative and gram-positive bacteria; and in its essentially pure crystalline form, (b) is soluble in water, methanol, ethanol, butanol, methylene chloride, chloroform, ethylene dichloride, and relatively insoluble in cyclohexane; (c) shows maximum ultraviolet absorption at $220\mu$, $a=39$ in 95% aqueous ethanol; (d) has an optical rotation $[\alpha]_D^{25}=+95.9°$ (c., 1.027, water); (e) has a character infrared absorption spectrum as shown in FIGURE 1 of the accompanying drawing; (f) has a characteristic papergram pattern as shown in FIGURE 2 of the accompanying drawing; and as its 2,4-dinitrophenylhydrazone (g) has the following elemental analyses: C, 47.65; H, 4.25; N, 12.93; O, 33.36; S, 0.26; halogens, trace; (h) has a molecular weight of 424; (i) has an equivalent weight of 411 (as determined by potentiometric titration); (j) has an optical rotation $[\alpha]_D^{25}=-24°$ (c., 0.973, 95% ethanol); (k) has a melting point of 146–149° C., (l) has a characteristic ultraviolet absorption spectrum (in ethanol) as follows: max. at $208\mu$, $a=42.66$; sh. at $235\mu$, $a=32.33$; sh. at $248\mu$, $a=31.86$; sh. at $283\mu$, $a=18.54$; max. at $370\mu$, $a=65.27$; and (m) has a characteristic infrared absorption spectrum as shown in FIGURE 3 of the drawing.

5. The compound, rancomycin I, according to claim 4, in its essentially pure form.

6. The compound, rancomycin I, according to claim 4, in its essentially pure crystalline form.

7. The 2,4-dinitrophenylhydrazone of rancomycin I, the compound defined in claim 4.

Figure 4:
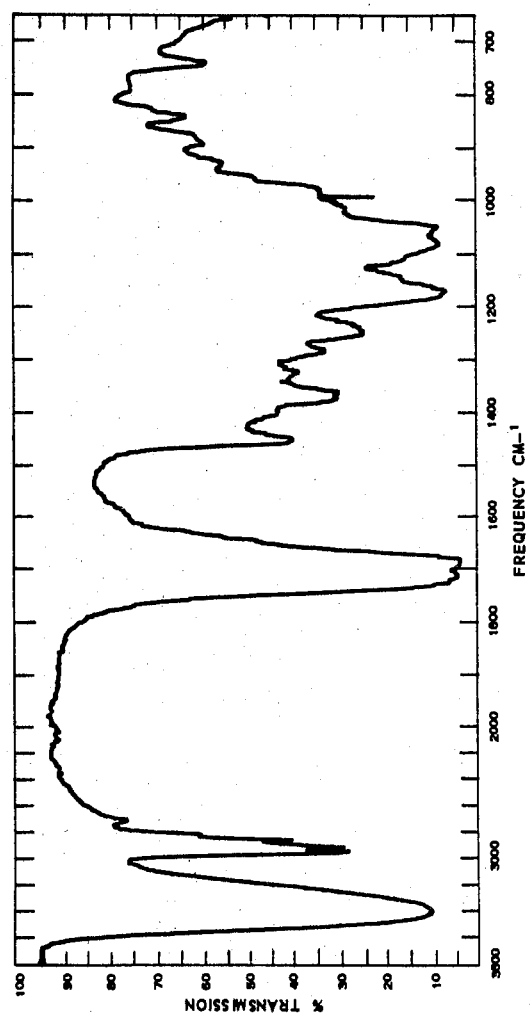
FIGURE 4—Infrared absorption spectrum of rancomycin II.

8. Rancomycin II, a compound which is substantially free from admixture with rancomycin I and which (a) is effective in inhibiting the growth of various gram-negative and gram-positive bacteria; and in its essentially pure crystalline from, (b) is soluble in water, methanol, ethanol, butanol, methylene chloride, chloroform, ethylene dichloride, and relatively insoluble in cyclohexane; (c) shows maximum ultraviolet absorption at $220\mu$, $a=30$ in 95% aqueous ethanol (d) has an optical rotation $[\alpha]_D^{25}=+69°$ (c., 1.17, water); (e) has a characteristic infrared absorption spectrum as shown in FIGURE 4 of the accompanying drawing; (f) has a characteristic papergram pattern as shown in FIGURE 5 of the accompanying drawing; and as its 2,4-dinitrophenylhydrazone (g) has the following elemental analyses; C, 48.77; H, 4.96; N, 12.79; O, 31.50; S, 0.21; halogens, trace; (h) has a molecular weight of 438; (i) has an equivalent weight of 421 (as determined by potentiometric titration); (j) has an optical rotation $[\alpha]_D^{25}=-17°$ (c., 1.0, 95% ethanol); (k) has a melting point of 162–163° C.; (l) has a characteristic ultraviolet absorption spectrum (in ethanol) as follows: max. at $208\mu$, $a=40.82$; sh. at $235\mu$, $a=30.92$; slight sh. at $248\mu$, $a=30.46$; slight sh. at $283\mu$, $a=17.81$; max. at $371\mu$, $a=61.89$; and (m) has a characteristic infrared absorption spectrum as shown in FIGURE 6 of the drawing.

9. The compound, rancomycin II, according to claim 8, in its essentially pure form.

10. The compound, rancomycin II, according to claim 8, in its essentially pure crystalline form.

11. The 2,4-dinitrophenylhydrazone of rancomycin II, the compound defined in claim 8.

12. A process for making the fermentation broth defined in claim 1 which comprises cultivating *Streptomyces lincolnensis* var. *lincolnensis* in an aqueous synthetic nutrient medium which is substantially free of sulfate ions, under submerged aerobic conditions, at a pH below about 7.5, until substantial antibacterial activity is imparted to said medium by the production of rancomycin I and rancomycin II.

13. A process for separating rancomycin I and rancomycin II from a mixture containing the same which comprises subjecting said mixture containing rancomycin I and rancomycin II to liquid-liquid distribution in a Craig apparatus using a solvent system consisting of 1-butanol:water in equal parts and isolating rancomycin I and rancomycin II substantially free from admixture.

References Cited

UNITED STATES PATENTS 3,086,912   4/1963   Bergy et al. _____ 167—65

ALBERT T. MEYERS, Primary Examiner

D. M. STEPHENS, Assistant Examiner